United States Patent [19]

White

[11] 4,043,564
[45] Aug. 23, 1977

[54] PITMAN SHAFT BOOT SEAL

[75] Inventor: David G. White, Phelps, N.Y.

[73] Assignee: Garlock Inc., Palmyra, N.Y.

[21] Appl. No.: 607,065

[22] Filed: Aug. 22, 1975

Related U.S. Application Data

[63] Continuation of Ser. No. 473,331, May 28, 1974, abandoned.

[51] Int. Cl.² ............................................. F16J 15/50
[52] U.S. Cl. ............................. 277/212 FB; 403/50
[58] Field of Search ......... 277/88, 207 R, 87, 212 FB, 277/42; 403/50, 51

[56] References Cited

U.S. PATENT DOCUMENTS

| | | | |
|---|---|---|---|
| 2,497,704 | 2/1950 | Voytech | 277/42 |
| 2,992,843 | 7/1961 | Smith | 277/88 |
| 3,451,700 | 6/1969 | Smith | 277/212 FB |
| 3,596,915 | 8/1971 | Snidar | 277/212 FB |

Primary Examiner—Richard E. Aegerter
Assistant Examiner—L. Footland
Attorney, Agent, or Firm—Schovee & Boston

[57] ABSTRACT

A Pitman shaft boot seal designed for a static sealing application with one sealing surface compressed against the Pitman arm and the other sealing surface compressed against the steering gear housing. The sealing surfaces are held in place by a compression spring located inside the boot seal. The cylindrical portion of the boot seal is formed with a plurality of identical, equally spaced-apart, parallel, hollow ribs parallel to the axis of the Pitman shaft and extending around the entire circumference of the seal. The ribs allow the boot seal to twist as the Pitman arm moves arcuately, without breaking the static seal at the sealing surfaces.

1 Claim, 4 Drawing Figures

PITMAN SHAFT BOOT SEAL

This is a continuation of application Ser. No. 473,331, filed May 28, 1974, now abandoned.

BACKGROUND OF THE INVENTION

1. Field of the Invention

This invention relates to providing a seal for a Pitman shaft between the lower end of the steering housing and the Pitman arm.

2. Description of the Prior Art

The Pitman shaft is an integral part of the steering gear and is the direct link between the gear mechanism and the steering linkage. Corrosion due to water and road dirt attacks the Pitman arm of the steering gear from the area above the Pitman arm to the already sealed area inside the gear housing. This corrosion can be damaging to the inner seals as well as to the area the seals are protecting, ultimately producing loss of dependability of parts and costly repair of the steering gear.

It is therefore the primary object of the present invention to provide a seal to protect this area, with the inner seals therein as the primary concern, and without interfering with functioning of the Pitman arm and shaft as the shaft moves axially and as the arm moves arcuately, up to about 45° on each side of a normally central position. The distance between the bottom of the gear housing and the Pitman arm varies between about 0.340 and 0.860 inches. The seal therefore must compensate for potential travel of 0.520 inches.

SUMMARY OF THE INVENTION

A Pitman shaft boot seal for protecting the Pitman shaft and inner seals in the gear housing from water and road dirt. The boot seal includes a cylindrical seal member having a first static sealing surface at one end thereof compressed against the steering gear housing and a second static sealing surface at the other end thereof compressed against the Pitman arm. The two static sealing surfaces are held in place by a conical, metal, coil, compression spring located inside of boot seal. The wall of the cylindrical member is formed with a series of identical, parallel, hollow ribs parallel to the axis of the cylindrical member and extending around the entire circumference of the seal member. The hollow ribs allow the seal to twist with movement of the Pitman arm up to at least 45° in each direction from a central position of the seal, without breaking the static seal at each end of the seal member.

BRIEF DESCRIPTION OF THE DRAWINGS

The present invention will be more fully understood by reference to the following detailed description thereof, when read in conjunction with the attached drawings, wherein like references numerals refer to like elements and wherein.

DETAILED DESCRIPTION OF THE PREFERRED EMBODIMENT

Figure 1:
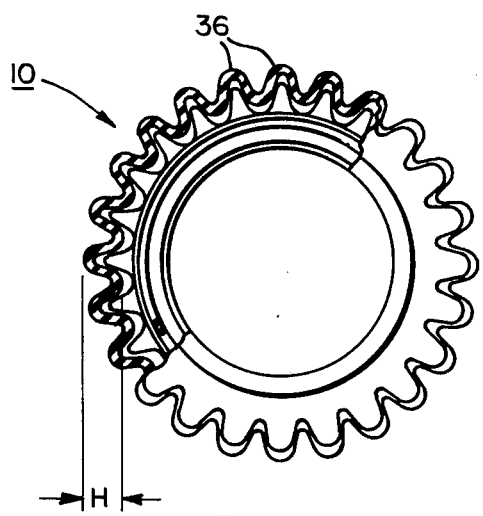
FIG. 1 is a partly cross-sectional front view of the seal of the present invention.
Figure 2:
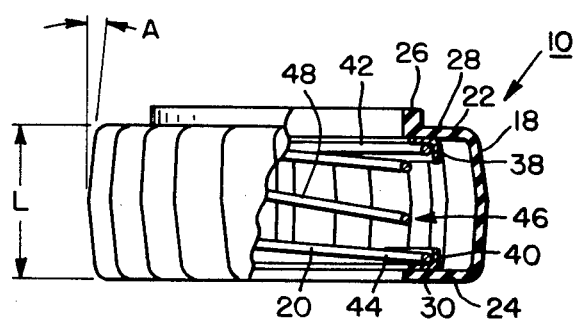
FIG. 2 is a partly cross-sectional end view through the seal of FIG. 1.
Figure 3:
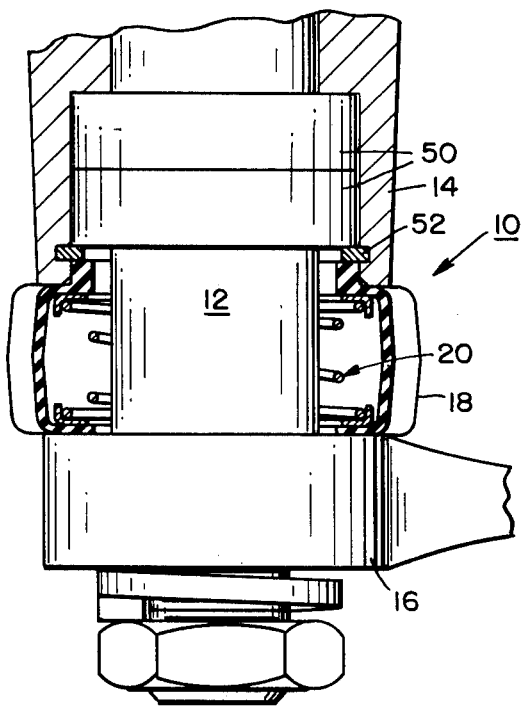
FIG. 3 is a partly cross-sectional view of the seal of the present invention as installed on a Pitman shaft.
Figure 4:
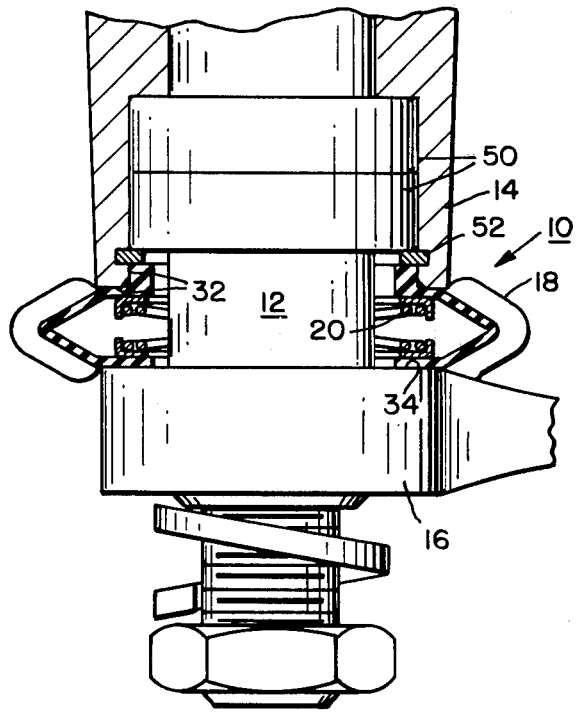
FIG. 4 is similar to FIG. 3 but shows the seal in a collapsed and twisted position.

With reference now to the drawings, FIGS. 1 and 2 show a Pitman shaft boot seal 10 according to the present invention, and FIGS. 3 and 4 show the seal 10 installed around a Pitman shaft 12 and between a steering gear housing 14 and a Pitman arm 16.

With reference now to FIGS. 1 and 2, the seal 10 comprises a generally cylindrical seal member 18, preferably made of neoprene rubber, and a compression spring means 20 inside of the seal member 18. The seal member 18 includes a first radial portion 22, extending radially inwardly at one end thereof, and a second radial portion 24, extending radially inwardly at the other end thereof. The first radial portion also includes an axial portion 26, extending axially outwardly from the distal end of the first radial portion 22. Outside surfaces 28 and 30 of the first and second radial portions 22 and 24, respectively, are the static sealing surfaces of the seal 10, and are held in static sealing contact with surfaces 32 and 34 of the housing 14 and the Pitman arm 16, respectively, by means of the compression spring means 20.

The cylindrical member 18 includes a plurality of identical, parallel, spaced-apart, hollow ribs 36 parallel to the axis of the cylindrical member 18. The ribs 36 have sufficient size and shape such that the seal 10 can twist up to about 45° in each direction from its central or normal orientation, and can at the same time collapse in an axial direction, both without breaking the two static seals at the sealing surfaces.

The compression spring means 20 includes a pair of annular metal caps 38 and 40 for receiving the end turns 42 and 44, respectively, of the spring means 20. The spring itself is a metal, conical, coil spring 46 having an inner turn 48 extending between the two end turns 42 and 44 and located such that when the spring 46 is completely compressed (as shown in FIG. 4), the spring 46 will be only two turns high rather than three or more because, being concial, one turn is inside of another. The end caps 38 and 40 spread the force of the end turns 42 and 44 against the radial portions 22 and 24, respectively and thus against the static sealing surfaces 32 and 34, respectively.

FIG. 3 shows the seal 10 installed on the Pitman shaft 12 for sealing the shaft 12 and inner seals 50 (held in place by a split ring 52) in the housing 14. This view is taken in-between the ribs 36. FIG. 4 shows the seal 10 when the Pitman arm has moved arcuately and axially, collapsing the seal 10; it is noted that the static seals, however, are not broken.

In a specific preferred embodiment, the seal 10 had an O.D. of 2.62 inch, an I.D. of 1.76 inch, a length L of 1.00 inch for the ribs 36, and a length 1.12 inch from sealing surface 30 to the top of the axial portion 26. The neoprene rubber of the seal 10 had a thickness of 0.06 inch, the ribs had a taper angle A of 5° and a height H of 0.31 inch. The seal 10 was installed in a space that varied from 0.860 to 0.340 inch wide.

The invention has been described in detail with particular reference to the preferred embodiments thereof, but it will be understood that variations and modifications can be effected within the spirit and scope of the invention as described hereinabove and as defined in the appended claims.

I claim:

1. A seal for use between a pair of axially spaced-apart, coaxial members which are axially and arcuately relatively movable comprising:
   a. a flexible, generally cylindrical, annular seal member having an axially extending opening therethrough concentric to said seal member, said seal member also having a single wall and having a first static sealing surface on an axially outer surface at one end thereof, and a second static sealing surface on an axially outer surface at the other end thereof,
   b. annular compression spring means located inside of said seal member for forcing said two ends thereof away from each other and for providing a sealing force for said static sealing surfaces,
   c. said seal member having a generally cylindrical portion including a plurality of spaced-apart, hollow, elongated, substantially straight ribs with their longitudinal direction being in a direction generally parallel to the axis of the seal member, said ribs extending in an axial direction substantially the entire length of said seal member, and
   d. each of said hollow ribs having a pair of spaced-apart radial sidewalls and a single circumferential wall extending between the radially outer ends of each pair of sidewalls, and wherein each of said ribs tapers in a radial direction from a wider thickness at its proximal end to a narrower thickness at its distal end.